April 6, 1948.  R. W. SMITH  2,439,191
LOCK NUT
Filed Feb. 26, 1946
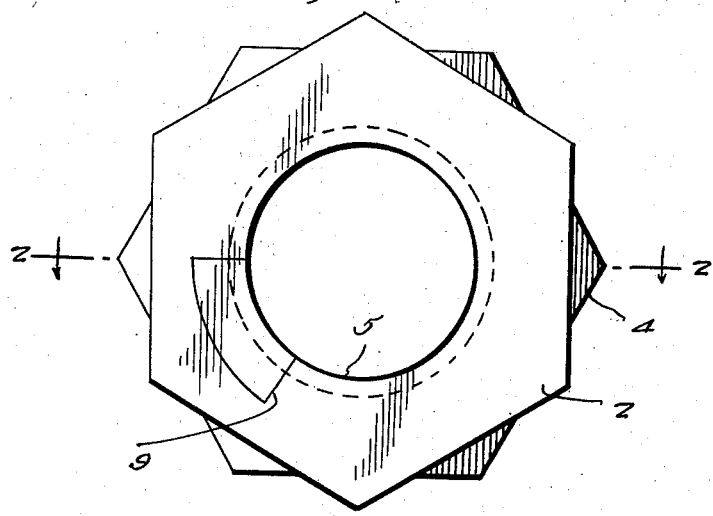
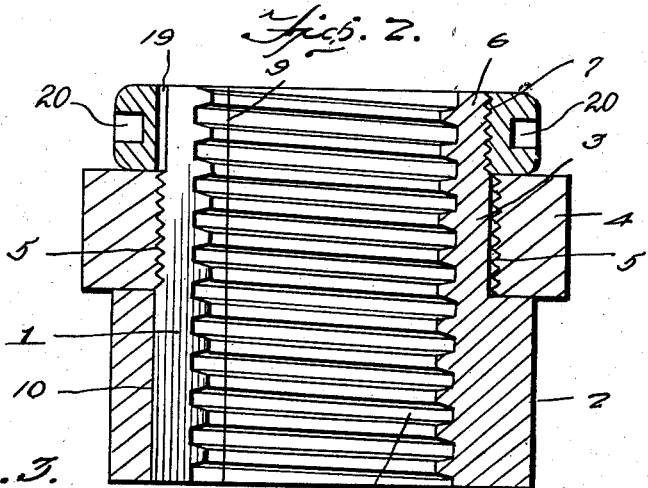
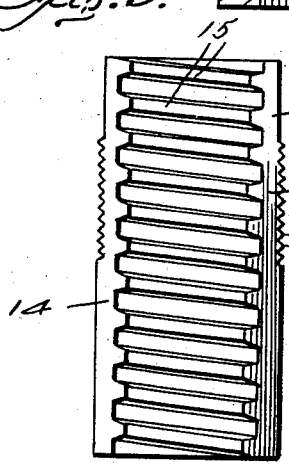
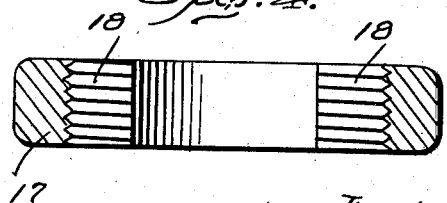
Inventor
Robert W. Smith
Attorneys Patented Apr. 6, 1948

2,439,191

UNITED STATES PATENT OFFICE 2,439,191

LOCK NUT

Robert W. Smith, Brunswick, Maine

Application February 26, 1946, Serial No. 650,269

3 Claims. (Cl. 151—23)

This invention relates to locking nuts and more particularly to means for locking a nut on a bolt.

The principal object of the invention is the provision of a lock nut, wherein a nut is securely locked on a bolt in such manner that it cannot work itself loose.

A further object of the invention is the provision of a lock nut wherein the nut may be threaded on the associated bolt, as a whole, and may be locked by a simple and readily performed operation.

Still a further object of the invention relates to the provision of a locking nut, comprised of relatively few parts, which may be readily assembled and disassembled and which is inherently sturdy and durable.

With these and still further objects in view, the invention resides in a certain novel construction and combination and arrangement of parts, the essential features of which are hereinafter fully described, pointed out particularly in the appended claims, and illustrated in the accompanying drawings, in which:

Figure 1 is a bottom plan view of a lock nut constructed in accordance with my invention;

Figure 2 is a vertical section taken on the line 2—2 of Figure 1;

Figure 3 is a locking section of the nut, illustrated in vertical elevation; and Figure 4 is a sectional view taken vertically through a retaining nut, comprising a part of the invention.

Referring now to the drawings in detail, the nut 1 is provided with a wrench section 2 and with a reduced boss or extension 3, the extension having no external threads and being adapted slidably to engage the internally threaded lock operating nut 4, the threads 5 of the nut 4 sliding smoothly on the surface of the extension 3.

Adjacent the extension 3 is a still further reduced boss 6 having external threads 7.

The nut 1 is internally threaded preferably with Acme type threads 8 three to the inch, for threadedly securing said nut 1 on a suitable bolt or threaded shaft end, not illustrated.

A section of the nut 1 corresponding precisely in internal outline to the locking nut illustrated in Figure 3 of the drawings, is cut away leaving a gap 9 in the extension 3 and the boss 6 and providing an internal slot 10 in the wrench section aligned with the gap 9.

Within the gap 9 and the slot 10 may be inserted an internally threaded locking section 14, illustrated in Figure 3 of the drawings, provided with internal threads 15 adapted to complete the internal threading 8 of the nut 1, and provided with a reduced extension 12 and a further reduced extension 13 corresponding to the extension 3 and the boss 6 in diameter, respectively. The locking section 14 at its reduced extension 12 is provided with screw threads 16, preferably eight to the inch, and adapted to threadedly engage the nut which slidably engages the unthreaded extension 3. The further extension 13 of the locking section 14 is unthreaded.

Retaining nut 17 is internally threaded with threads 18 adapted to threadedly engage the external threads 7 of the boss 6 and is provided with an internal cut-away 19 subtending an angle at least equal to that subtended by the extension 13 and of sufficient depth to provide clearance for the screw threads 7. Retaining nut 17 is provided with holes 20 suitable for a spanner wrench, which is required since the retaining nut 17 is circular in shape externally thereof.

In its application, the nut is applied to a threaded shaft portion or bolt, as a whole, by means of the wrench section 2, and after the nut has been tightened, the lock operating nut 4 may be tightened to cause relative translatory movement of the locking section 14 and the main nut section, whereby to lock the main nut.

While I have described one embodiment of my invention, it is to be understood that various modifications may be made in the arrangement of parts and in the details of structure, without departing from the spirit of the invention as defined in the appended claims.

What I claim and desire to secure by Letters Patent of the United States is:

1. A lock nut comprising a wrench section having internal threads and provided with a longitudinal slot, a locking section slidable in said longitudinal slot and provided with external threads, a locking nut threadedly engaging said external threads.

2. A lock nut comprising an internally threaded wrench section carrying a separate longitudinally translatable locking section, and rotatable means externally carried and manipulated for translating one section with respect to the other.

3. A lock nut comprising a wrench section having internal threads and provided with a longitudinal internal arcuate cut-away, a locking section provided with internal thread sections matching the internal threads of said wrench section, and slidably engaging said cut-away, said locking section being provided with external threads, an external unthreaded reduced extension for said wrench section substantially aligning with said external threads, a locking nut engaging said external threads and slidable about said reduced extension, a retaining nut and retaining screw threads formed on a still further reduced extension of said wrench section, said retaining nut being provided with an internal arcuate slot at least co-extensive with said locking section.

ROBERT W. SMITH.

REFERENCES CITED

The following references are of record in the file of this patent:

UNITED STATES PATENTS

| Number | Name | Date |
|---|---|---|
| 1,204,623 | Waller | Nov. 14, 1916 |